INVENTOR.
JOACHIM KOLBE
BY Andrus & Starke
ATTORNEYS

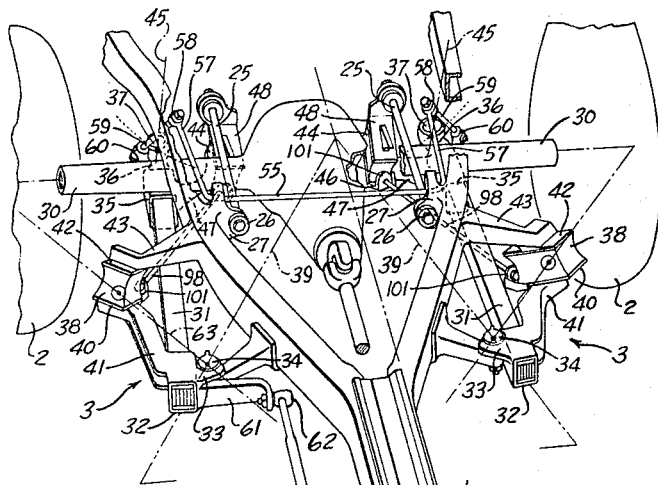

United States Patent Office 3,383,118
Patented May 14, 1968

3,383,118
VEHICLE
Joachim Klobe, 5126 Haskell Ave.,
Encino, Calif. 91316
Filed Mar. 17, 1966, Ser. No. 535,079
9 Claims. (Cl. 280—112)

This invention relates to vehicles with improved automobile suspensions having resilient means interposed between the wheel supporting members and the superstructure. The vehicle may be of the kind in which the superstructure leans outwardly during the curve ride or it may be of the kind for which a banked position is secured for the superstructure. The invention will in both cases result in an improved performance due to revised functioning and to improved structure of the suspension means.

The application constitutes a disclosure of ideas resulting from development work on banking arm supported curve-bank car structures described and illustrated in U.S. Patent No. 3,181,883, entitled, Vehicle With Curve-Bank Suspension, and issued May 4, 1965, to the present inventor. The term banking arm, as introduced and defined for banking suspensions, is set forth in Patent No. 2,576,686, granted Nov. 27, 1951, to the present inventor.

Later reorganizations and simplifications of structure and progressive expansions of its functions have been disclosed in a number of U.S. patents granted to the present inventor, all referring to Curve-Bank Cars and including by way of example U.S. Patent No. 2,760,785, entitled or referred to as Sway Bar Operated Banking and introducing Roll Banking Arms and issued Aug. 28, 1956; U.S. Patent No. 2,739,658, entitled or referred to as King-pin Banking Hinge Vehicle, and issued Mar. 27, 1956; and U.S. Patent No. 2,820,646, entitled or referring to Dual-turn Shackles and issued Jan. 21, 1958.

This invention is directed to a redistribution and redirection of forces within the running gear of roll banking arm supported curve-bank cars employing torsion leaf spring bundles, resulting in improved damping control and resiliency as well as in simplification of mounting of the roll banking arms.

The invention is based on the recognition that the conversion of the torsion spring bundles from beams to compression members arranged within a struss structure comprising also newly introduced damping control struts results in improved springing for the vehicle and also greatly simplifies the mounting of the roll banking arms into the superstructure, eliminating otherwise necessary wind-up tools, and gives greater control for the height positioning of the superstructure relative to the road.

The principal object of this invention is to eliminate forces and factors interfering with the design resiliency of the torsion leaf spring bundles incorporated into curve-bank cars.

An equally important general object of this invention is to rearrange the roll banking arm structure to gain greater control over damping, mounting, and positioning for the system.

A more specific object of the invention is to reduce bending deformations of the spring bundles caused by the multiple force components active within the system and resulting from the inclinations of the load transferring multi-turn cushions forming a part of the roll banking arm structure.

The invention transforms bending loads active within each spring bundle into separate compression and tension loads and keeps the torsion leaf spring bundles substantially under compression only while transferring the tension loads to the newly introduced damping control strut.

The damping control strut, newly incorporated into each roll banking arm, contributes in the control of the varying amounts of torsion spring windup desired during the transition from mounting with substantially zero windup to final full load carrying windup, thereby securing the static road travel position for the superstructure.

The new mounting means for the roll banking arms are coordinated to the windup of the respective torsion leaf spring bundle by means of the damping control strut.

The spring windup system is made self sufficient for progressive windup without the use of separate windup tools especially built for the purpose, thereby making it possible to secure an assembly method for the curve-bank car suspension system on the broadest possible level, such as individual incorporation into used cars executed in home garages with small and simple standard hand tools only.

New anchoring means are provided between the ends of each spring bundle and its respective suspension lever arm, and which are designed to contribute to the progressive windup of the spring bundles after the assembly is loosely positioned between the superstructure and the wheel supporting means.

The invention utilizes both vertical and lateral space between the spring bundle ends and the anchor boxes to allow for leaf bundle windup from an inclined sectional view into a vertical position as appearing in transverse view, and from an inclined into a substantially static horizontal position as appearing in side elevation of the spring bundle.

The construction has greater flexibility in the vertical position of the superstructure as desired in response to varying superstructure load carrying demands.

The invention utilizes varying means suited to serve as a damping control strut, such as a single spring leaf, contributing as a tension carrying member in accordance with the invention and as a torsionally operated resilient member as well, assisting in resiliently supporting the superstructure of the vehicle and, depending on its preshaped condition, to secure or influence varying spring rates.

Additional spring leaves may be clamped to the main torsion leaf spring bundle at suitable locations, and are torsionally operated to assist in the resilient support of the superstructure and to simultaneously resist bending deflections of the bundle in a horizontal plane.

Structural members of the roll banking arm may be used as windup means, each capable to contribute its share of windup of a selected amount of the resilient resistance of the spring bundle as a whole.

The accompanying drawings illustrate the best mode presently contemplated by the inventor for carrying out the invention.

In the drawings:

FIGURE 1 is a perspective view of a vehicle chassis embodying the invention and showing the superstructure in a normal upright position;

FIG. 2 is a schematic front elevation of the vehicle having the superstructure mounted as shown in FIG. 1 and turned to a roll banked position;

FIG. 9 is a perspective deflection diagram for a typical front banking arm structure, serving to clarify the damping control strut arrangement as illustrated in FIG. 1 for that section of the chassis.

Figure 4:
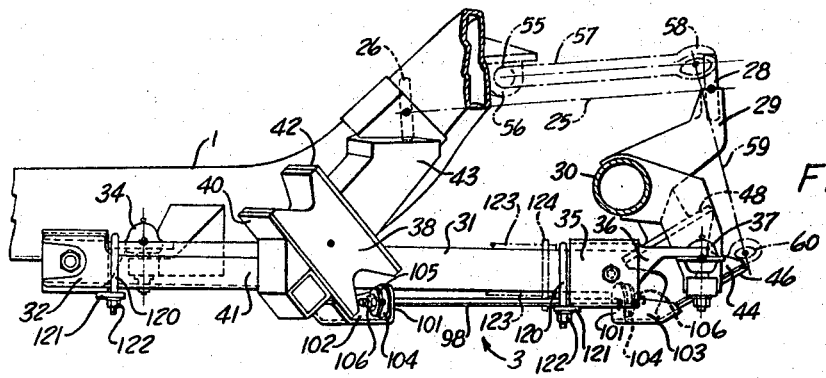
FIG. 4 is a side elevation of the structure of FIG. 3.

FIG. 1 illustrates a curve-bank car chassis including wheel steering mechanism and activating means for the roll-bank motion of the superstructure operating in response to centrifugal forces. These operating means and mechanisms are included in the illustration to emphasize that greater inter-relationship between members of the complete chassis linkage is designed into curve-bank cars in order to secure the desired improvements previously disclosed and those added in this disclosure.

In FIG. 1 a vehicle body or superstructure is shown having a chassis or body support frame 1 supported by wheels 2 on the road. The wheels 2 are arranged in pairs, one pair at the front end and the other pair at the rear end of the vehicle. The wheels of each pair are disposed on opposite sides of the superstructure and are equally spaced from the longitudinal vertical center plane of the vehicle.

The front wheels 2 and their corresponding wheel carriers 3 form a front pair of effective multi-turn cushion controlled roll banking arms supporting the front end of the superstructure.

Each front wheel carrier 3 comprises an upper control arm 4 pivotally attached to the frame 1 by the substantially longitudinally extending hinge 5 and connected by the ball and socket joint 6 to a wheel supported member 7 which also serves as a kingpin member and carries the wheel spindle 8. In addition, each carrier 3 has a lower suspension arm unit 9 comprising a transversely extending leg 10 and a longitudinally extending leg 11. Leg 11 also serves as a vehicle main support torsion spring for the corresponding share of the weight of the vehicle, since the leg 11 comprises the torsion leaf spring bundle 12.

The transversely extending leg 10 of each lower suspension arm unit 9 is pivoted at its outer end by the universally movable ball and socket joint 13 to the wheel supported spindle member 7, and at its inner end by the universally movable ball and socket joint 14 to a longitudinally extending lever 15 pivoted by a substantially vertically placed pivot 16 to the frame 1. Lever 15 serves both transversely extending legs 10 as a common inner end support.

The longitudinally extending legs 11 each comprise the torsionally stressed leaf spring bundle 12 anchored at its forward end into the anchor box 17 which forms a hinged fork shaped to carry the hinge 18 which in turn serves as a kingpin banking hinge for that section of the vehicle. The hinge 18 may be constructed by placing two ball and socket joints spaced apart along its hinge axis line.

Kingpin banking hinges and their functions are disclosed and described in Kolbe Patent No. 2,739,658 issued Mar. 27, 1956.

The backward end of each torsional leaf spring bundle 12 located at either side of the vehicle is anchored into the corresponding anchor box 19 supported and secured by a ball and socket joint 20 to the frame 1. Each anchor box 19 forms an integral part with an outwardly extending support arm 21. The outer end of arm 21 forms a carrier plate 22 extending longitudinally with its surface inclined preferably about 30° to the road and with its forward end placed lower than its backward end while the vehicle is viewed in side elevation, and extending substantially horizontally in transverse direction.

The carrier plate 22 carries the multi-turn cushion 23 which rests against the frame supported plate 24, which in turn extends substantially parallel to the carrier plate 22.

The positioning of the multi-turn cushion 23 in an inclined position results in improved resistance against loss of torsional deflection of the corresponding leaf spring bundle 12 during the banking turn of the superstructure, as described in Kolbe Patent No. 3,181,883, referred to above.

The rear axle carriers 3 illustrated in FIG. 1 each comprise an upper torque rod or link 25 connected by a universally movable joint 26 at its forward end and bracket 27 to the frame 1, and at its backward end by means of a universally movable joint 28 and axle bracket 29 to the rigid axle housing 30 respectively.

Each rear carrier 3 further comprises a longitudinally extending torsion leaf spring bundle 31 serving as a lower suspension arm and connected at its forward end through axle box 32 and arm 33 by the ball and socket joint 34 to the frame 1, and at its backward end through the anchor box 35 and arm 36 by the ball and socket joint 37 to the axle housing 30.

Multi-turn cushions 38 are placed a selected distance away from and extend with their support surfaces perpendicular to effective roll banking axes 39 which intersect the centers of the ball and socket joints 34. The lower carrier plates 40 for the multi-turn cushions 38 are supported by the arms 41 extending outwardly and rearwardly at approximately 45° from the anchor boxes 32 located at the forward ends of the torsional leaf spring bundles 31.

The multi-turn cushions 38 are supported against upper support plates 42 which are resting against brackets 43 carried by the frame 1.

The multi-turn cushions 44, resting against the axle housing 30, are also placed a selected distance away from and extend with their support surfaces perpendicular to effective axle banking hinge axes 45 which intersect the ball joints 37 and constitute the geometric center lines for the relative travel path of the related connecting members between frame 1 and the forward ends of the wheel carriers 3. Each multi-turn cushion 44 is supported by the corresponding lower carrier plate 46 which in turn is connected by the support arm 47 to the anchor box 34. The multi-turn cushion 44 rests against the upper support plate 48 extending rearwardly from the axle housing 30. The support plate 48 extends substantially parallel to the carrier plate 46 and confines the cushion therebetween.

The multi-turn cushions or rubber blocks 44 are inclined as described for the blocks 23 arranged in the front of the vehicle and function in a similar manner.

A sway bar 49 is attached in the front of the vehicle to the frame 1 by the bearings 50. The outer ends of the sway bar 49 form longitudinally extending sway bar arms 51 which are connected by pivotal or rubber bearings 52 to inclined sway bar shackles 53. The shackles 53 are connected by pivotal or rubber bearings 54, which are spaced farther apart than the upper shackle bearings 52 to the outer ends of the transversely extending legs 10 of the lower front suspension arm units 9.

In the rear of the vehicle, a similar sway bar 55 may be added and is illustrated as being attached by the bearings 56 to the frame 1. The sway bar 55 has longitudinally extending arms 57 on either end, which are connected by upper pivotal or rubber bushings 58 to inclined shackles 59 with lower pivotal or rubber bearings 60 also spaced farther apart than the upper pivots 58, connecting the shackles 59 to the rear axle housing 30.

The front and rear wheel carriers 3 are connected to operate in unison in curve-banking, as shown in earlier disclosures such as Kolbe U.S. Patent No. 2,788,984.

The rear suspension forward anchor box 32 located on the right side of the vehicle in the embodiment shown in FIG. 1 carries an arm 61 extending inwardly with the ball and socket joint 62 on its end placed in or near the theoretical axis 63 which extends through the rear frame supported ball and socket joint 34 and through the approximate center of the multi-turn cushion 38. This arm 61 constitutes part of a tie, provided in effect between the front and rear pairs of wheels 2 to secure proper track holding for the vehicle.

A longitudinally extending tie-rod 64 carries at its rear end the ball and socket joint 62 and at its forward end a ball and socket joint 65 which is carried by the substantially horizontally and transversely extending lever 66 disposed to turn about a substantially vertically extending pivot 67 supported by the frame 1.

A second longitudinally extending tie-rod 68 carrying at its rear end the ball and socket 69 which is also supported by the lever 66 and carrying at its forward end the ball and socket joint 70, interconnects the lever 66 and the transversely extending lever 71 which forms a bell-crank portion of the centrally located lever 15 in the front of the vehicle.

A steering hand wheel 72 operates a steering gear unit 73 carried by the frame 1 and supporting a Pitman arm 74 extending transversely of the direction of the vehicle. A substantially longitudinally extending drag link 75 is connected by a ball and socket joint 76 on its forward end to the outer end of the Pitman arm 74 and at its rear ward end by a ball and socket joint 77 to the outer end 78 of one of a transversely extending two-arm lever 79 which pivots about the centrally located substantially vertically extending hinge 80 carried by the frame 1.

The outer end 81 of the lever 79 is connected by a ball and socket joint 82 to a substantially longitudinally extending drag link 83, hereinafter called banking drag link, which in turn is connected by the ball and socket joint 84 to the sidewardly extending lever arm 85 of the bell crank 86 which comprises also the longitudinally extending lever arm 87 and which pivots about the vertically extending bell crank pivot 88 supported by the longitudinally extending centrally placed suspension arm 15 at its outer end.

The lever arm 87 carries on one side of its downwardly extending forward section the ball and socket joint 89 supporting the steering tie-rod 90 connected to the steering arm 91 by the ball and socket joint 92, and carries on the other side of its downwardly extending forward section the ball and socket joint 93 supporting the steering tie-rod 94 connected to the steering arm 95 by the ball and socket joint 96. The steering tie-rods 90 and 94 are shaped to secure swinging freedom for an overlapping condition, necessitated by the steering geometry and desirable since the inner ball joints 89 and 93, located near the longitudinally and vertically extending center plane of the vehicle can thereby be placed close to the extensions 97 of the respective connecting axis lines of the suspension ball joints 20 and 14, thereby excluding interference between steering and wheel oscillation in that area.

In the operation of the curve-bank car superstructure and suspension mechanism illustrated in FIG. 1 and partly shown as moved into the curve-banked position in FIG. 2, the right hand front sway bar shackle 53 has erected itself and lifted the right hand side of the superstructure supported by its frame 1, turning it around the pre-designed effective banking roll center away from the road, while the left hand front sway bar shackle 53 has the left hand side of the superstructure pulled downwardly.

Similar turn and shift motions take place throughout the mechanism as described in detail in Kolbe U.S. Patent No. 3,181,883, referred to above.

Incorporated into the chassis of the vehicle in accordance with the invention also illustrated in FIG. 1 are the damping control struts 98 in the rear of the vehicle, where they extend between the lower edges of the lower carrier plates 40 supporting the multi-turn cushions 38 and the lower edges of the lower carrier plates 46 supporting the multi-turn cushions 44.

In the front of the vehicle, front damping control struts 99 extend between the lower edges of the lower carrier plates 22 supporting the multi-turn cushions 23 and the spring bundle enclosing clamps 100, placed substantially centrally along the length of the torsion leaf spring bundles 12.

Figures 3, 8:
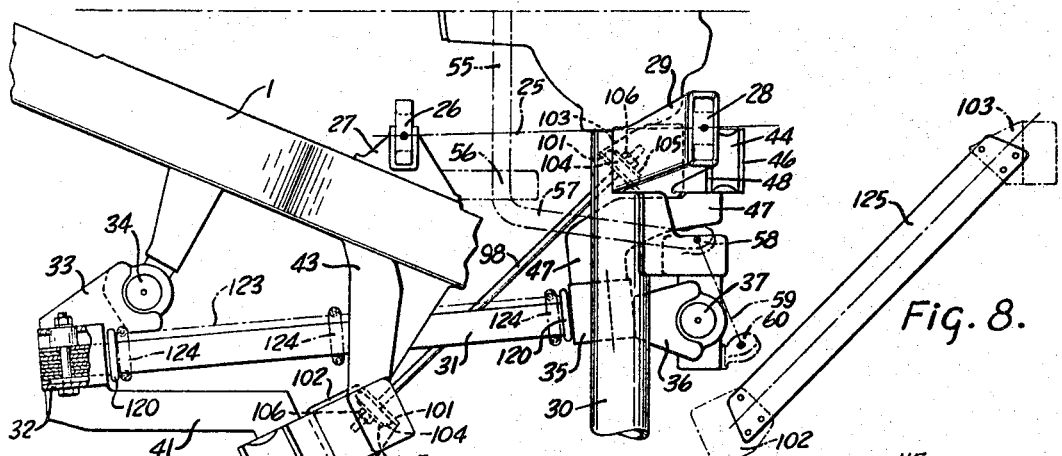
FIG. 3 is a top plan view of the left hand rear district of a curve-bank car chassis similar to that shown in FIG. 1.
FIG. 8 is a top plan view of a single spring leaf shaped to serve as a damping control strut in the location indicated for the tie-rod shown in FIG. 3.

FIGS. 3 and 4 illustrate in top plan view and side elevation respectively the rear damping strut arrangement according to the invention in greater detail and illustrate added features of the invention as described hereinafter. The linkage part numerals applied in FIG. 1 are repeated in FIGS. 3 and 4 where substantially identical parts are designed to function in an identical manner.

The damping control struts 98 constitute rods extending through upwardly positioned bearing plates 101, which form a part of bearing brackets 102 and 103, bolted to the carrier plates 44 and 46. Rubber bushings 104 are placed between the bearing plates 101 and washer plates 105 at opposite ends of the rods 98. The distance between the bearing plates 101 is adjustable and controlled by adjuster nuts 106 which are turned towards each other along the threaded ends of the strut rods 98 to shorten the distance between the bearing plates 101, as desired.

Figure 5:
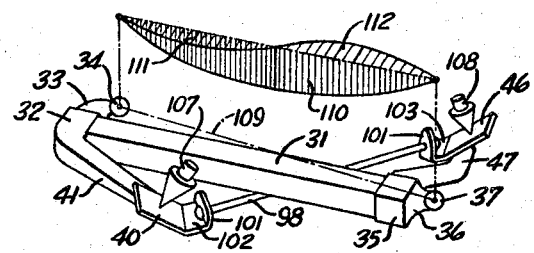
FIG. 5 is a perspective view of a rear banking arm structure similar to that shown in FIGS. 3 and 4 with a diagram added outlining the related deflection pattern caused by the forces as indicated by the force arrows drawn into the banking arm structure.

The rear struts 98 direct the forces active within the rear banking arm structure in a manner shown in a perspective deflection diagram and a related perspective illustration of the structure, both as shown in FIG. 5.

The illustration of the structure discloses a torsion leaf spring bundle 31, the forwardly located anchor box 32 with the arm 33 connected thereto and supporting the ball and socket joint 34, the rearwardly located anchor box 35 with the arm 36 connected thereto and supporting the ball and socket joint 37, the lower carrier plate 40 connected to the anchor box 32 by the arm 41 and the lower carrier plate 46 connected to the anchor box 35 by the arm 47. The strut 98 extends between the carrier plates 40 and 46. The forces transmitting the superstructure loads resiliently to the axle are indicated by the arrowheads 107 and 108 shown in their positions relative to the carrier plates 40 and 46 respectively. The axis line 109 interconnecting the ball joints 34 and 37 is also shown, in order to clearly relate the deflection diagram, illustrated as in the upper portion of FIG. 5, to the perspective of the structure.

Since the arrowhead 107 is located intermediate the ball joints 34 and 37, its vertical component causes the spring bundle 31 to bend with its center section downwardly as indicated in the deflection diagram with the plane 110, covered with vertical lines. The arrowhead 108 is contacting the axle supporting plate 46 in a point, which when connected with the center of ball joint 37 forms a line substantially rectangular to the axis line 109. The vertical component of arrowhead 108 will therefore exert little bending deflection in the spring bundle 31.

The horizontal components of both arrowheads 107 and 108 additionally will cause the spring bundle to deflect into an S shape creating a forward deflection diagram plane 111, extending to one side and resulting from the force 107 and a backwardly located plane 112 extending to the other side of the vertical bend plane 110 and resulting from force 108. Both planes 111 and 112 are covered with horizontal lines as appearing in the perspective.

In practical application of the suspension structure sufficient design strength of the spring bundle 31 can reduce bending deformations to an extent sufficient to avoid changes in length of the structure tending to interfere with the geometry of the layout. Static resiliency can be secured by the selected number and thickness of the leaves. However, the support forces active in the arrangement tend to create damping forces interfering with the proper resilience performance of the suspension, unless a redistribution of forces is secured by the installation of the damping control strut 98 placed as described for FIGS. 3 and 4.

Figure 6:
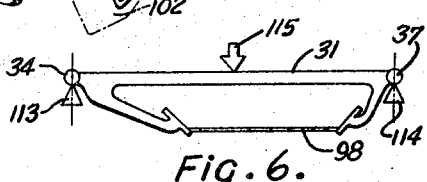
FIG. 6 is a diagrammatic outline disclosing the load relationships between spring bundle and strut active in the structures shown in FIGS. 1 to 5.

FIG. 6 illustrates diagrammatically the conversion of a beam structure into a struss structure, where such damping control rod is present.

The resultant effective bend-causing force for the spring bundle 31, end supported at the points 113 and 114, is indicated by the arrow 115. Extreme shortening of the rod 98 could actually bulge the center section of spring bundle 31 upwardly. In its most favorable setting, the length of rod 98 will maintain the compression component forces of the bending deflection in the spring bundle 31 and transfer the tension component forces of the bending deflection into the rod 98. Compression forces along the length of the spring bundle 31 relieves the damping interference—the leaves have a tendency to move slightly away from each other—and a greatly improved spring action is secured.

The damping control struts 98 and 99 as incorporated into the respective rear and front roll banking arms give an opportunity to secure additional improvements in structure, mounting, performance, and position control for the banking arm as extending between the superstructure and the wheel support means.

Figure 7:
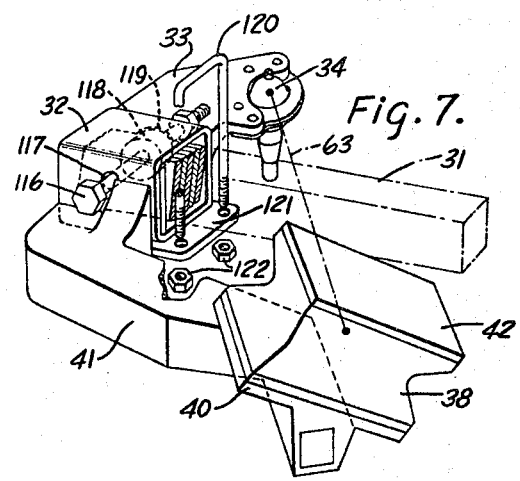
FIG. 7 is a perspective view of the deflection dual control device for the torsion leaf bundle ends as anchored to the respective multi-turn cushion support arms.

FIG. 7 illustrates the anchor box 32 designed to give maximum initial clearance for the end of the torsion spring bundle 31 to be placed into it while in an unloaded preshaped position. The ends of the leaves are illustrated inclined to the walls of the anchor box 32. The anchor bolt 116 is positioned through the vertically somewhat elongated holes 117 arranged near the ends of the individual spring leaves. A round pressure-transfer block 118 is carried by the bolt 116 and slidingly supported by the hole 119 in the wall of the anchor box 32.

A U-bolt 120 is arranged behind the anchor box 32 and illustrated as hanging over the spring bundle 31, with its ends extended towards corresponding holes in the plate 121 rigidly carried by the low side of the anchor box. U-bolt nuts 122 regulate the height position of the top surface of the spring bundle 31 relative to the anchor bolt 116. The arms 33 and 41 support the ball joint 34 and the related multi-turn cushion 38 respectively.

During the mounting of the roll banking arm starting with slipping of the anchor box 32 over the forward end of the spring bundle 31 which is pre-shaped into an inwardly inclined position, and after placing the ball joint 34 into its frame-supported socket, and after similarly placing the related parts into position on the rear end of the spring bundle 31 supported by the axle, tightening of the nuts 122 pulling the U-bolt 120 from its uppermost position, wherein the upper surface of the spring bundle touches the inner upper rearward edge of the anchor box 32, into a central position as shown in FIG. 4, a windup of the spring bundle 31 takes place, strengthening its torsional resistance and furnishing increasingly greater resilient support for the superstructure relative to the axle 30.

After the multi-turn cushions 38 and 44 are loosely placed into position, a progressive tightening of the nuts on the bolts 116, on the control rods 98, on the U-bolts 120 on both ends of each torsion spring bundle and on each side of the vehicle will wind up the two spring bundles to support the static load evenly, without one-sided pull between frame and axle to either side, and will anchor the bundle ends firmly, transfer the loads created into the respective multi-turn cushions 38 and 44 and thereby make an installation and disassembly possible without the use of heavy wind-up tools. This will enable even small out-of-the-way garage owners and parties interested in purchasing a single curve-bank car to assemble and serve such vehicle and will reduce cost and labor.

The damping control struts 98 are an important element in the assembly and spring loading of the roll banking arms because the arms 36 and 41 connecting the ball joints 37 and 34 with the respective lower carrier plates 46 and 40 provide the most efficient leverage for the purpose of spring windup.

A further means to facilitate the windup process in assembly is to restrict the initial spring bundle to fewer vertically placed leaves which constitute only a major share of the bundle but not all of the resilient means needed for the support of the vehicle, and to add one or more horizontally placed leaves 123 on the top and/or bottom of the bundle after initial completion of the assembly as illustrated in the dash-dot outline in FIGS. 3 and 4. Mounting clamps 124, preferably arranged on either end and in the center of each added spring leaf 123 will add resistance to the deflection of the bundle in a horizontal plane.

Since the damping control strut 98 changes its rotational position only but does not have to change substantially its angular position relative to the carrier plates 40 and 46 or relative to the strut brackets 102 and 103, where carried by the brackets, during either the oscillation movements or the banking movements of the roll banking arm as a whole, the strut can be replaced by a leaf strut 125 (see FIG. 8) which would become a part of the resilient support for the superstructure, where pre-shaped similarly to the leaves of the spring bundle 31. Such leaf can create variable rate spring effects, depending on its pre-designed shape. The leaf strut 125 could be provided with bolt holes and be bolted to the strut brackets 102 and 103, as illustrated in FIG. 8, or it could be directly bolted to the plates 40 and 46. The rod strut 98 might then function as a temporary windup support tool only. A turn-buckle in rod 98 with two end bolts (not illustrated) would be sufficient to function as such a windup support tool.

Although the rear multi-turn cushions 38, due to their position nearly half-way intermediate the distance between the ball joints 34 and 37, and due to their large inclinations relative to the vertical longitudinal center plane of the vehicle and to the road, cause the largest interference with the proper functioning of the torsion spring bundles 31, unless controlled by the use of the damping control struts placed in accordance with this invention, as described above, the invention can also be applied to the torsion leaf spring bundles 12 in the front of the vehicle.

FIG. 1 discloses such application by the incorporation of the control struts 99 designed under consideration of the front deflection diagram as shown in FIG. 9. The forces carried into the forward anchor box 17 by the kingpin banking hinge 18, as indicated by arrowheads 126 and 127, in combination with the forces carried into the rearward anchor box 19 by the superstructure load transferring multi-turn cushion 23, as indicated by the arrowhead 128 result in a relatively small single substantially upwardly extending arc deflection 129 in a vertical plane, combined with an S deflection comprising a forward arc 130 located in a horizontal plane and directed toward the vertical longitudinally extending center plane for the vehicle, and a rearward arc 131 also located in a horizontal plane but directed opposite to arc 130. The strut 99 extending between the downwardly extending arm 132 of the centrally located spring clamp 100 and the lower carrier plates 22 will relieve the bending deformations characterized by the arcs 129, 130, and 131, and will otherwise assist in providing a firm and exact anchoring for the rearward anchor 19.

The use of the front struts 99 incorporated as illustrated in FIGS. 1 and 9, or similar to the strut location illustrated for the rear when applied in the front and extending from the multi-turn cushion carrier plate 22 to the anchor box 17 at a point located a selected distance away from the kingpin banking hinge line 18, will contribute a smaller improvement in front spring bending deflection than that of the rear struts as placed into the rear assembly, but will assist in the mounting and location maintenance of the front roll banking arm.

In a similar manner, additional deflection control can be secured for the rear torsional leaf spring bundle 31 by providing a spring bundle clamp carried pivotal support for the damping control struts 98 placed in the neutral zone of the related banking arcs. In this manner, S deformation may be greatly reduced and full span arc deformation converted into far less objectionable S deformation.

Various modes of carrying out the invention are contemplated as being within the scope of the following claims particularly pointing out and distinctly claiming the subject matter which is regarded as the invention.

I claim:

1. In a vehicle of the class described having a superstructure, a banking support for the superstructure comprising at least two pairs of wheels, a plurality of co-operating roll banking arms supporting the superstructure, each including a torsion spring member connecting the superstructure to the unsprung mass of the vehicle, a lever arm extending laterally from each end of each of said torsion spring members and bearing against a resilient multi-turn cushion compressed under the load of said superstructure, and a ball-joint for each of said multi-turn cushions at the corresponding end of said torsion spring member and constituting the connection therefor to the superstructure thereby controlling the roll movement of the superstructure at all times; and a damping control strut stressed in tension and interconnecting the multi-turn cushion carrying lever arms of each roll banking arm.

2. The construction of claim 1 in which said damping control strut constitutes a tie-rod, adjustable in length, and compression bearings supported by the outer ends of said lever arms and carrying the tie-rod to provide flexibility during operation of the roll banking arms.

3. The construction of claim 1 in which said damping control strut constitutes a resilient spring leaf connected to said lever arms, 4. The construction of claim 1 in which said sidewardly extending lever arms bearing against corresponding multi-turn cushions are located on opposite sides of the respective torsion spring member, and in which the damping control struts extending in a diagonal direction below the torsion spring members contribute to the torsional wind-up of said torsion spring members.

5. The construction of claim 1 in which each torsion spring member comprises a bundle of leaves clamped at its opposite ends to separate anchoring means integral with the corresponding lever arms, and the clamping control strut is secured to the anchoring means for the corresponding bundle at a predetermined distance laterally of the bundle to thereby reduce bending deflection of the bundle.

6. The construction of claim 5 in which each anchoring means comprises an anchoring socket for loosely receiving the corresponding end of the torsion spring bundle, a U-shaped clamp disposed over the bundle and securing the same to one surface thereof, and an anchor bolt extending through said socket and having a pressure transfer block thereon for clamping said leaf bundle laterally relatively to said U-shaped clamp, said bolt and clamp being threaded to facilitate tightening upon the leaf bundle whereby the latter is torsionally stressed during assembly.

7. The construction of claim 5 in which each of the leaf bundles comprises a plurality of overlapping leaves secured in said anchoring means; additional leaves overlying the adjacent edges of said first named leaves transversely thereof, and clamp means securing said additional leaves to said first named leaves at the opposite ends of the bundles near said anchoring means and also intermediate the ends to resist bending of said first named leaves.

8. The construction of claim 5 and means connecting each dampening control strut to the corresponding leaf bundle intermediate the ends of the bundle, said connecting means being located in a neutral zone of the related banking arcs.

9. The construction of claim 5 in which each of said anchoring means constitutes a substantially square tubular member of selected dimensions to provide clearance in height and width for receiving the respective end of the leaf spring bundle in an unstressed condition and for repositioning it into static load position, an anchor bolt supporting the leaf ends of the bundle within the tubular member, a pressure-transfer block carried by said bolt, and means to firmly position the corresponding end of the leaf bundle within the tubular section of the anchoring means comprising a U-bolt adjustably placed over the spring bundle near the corresponding end of said tubular member and bolted thereto after pivoting the spring bundle about said anchor bolt for guiding it into its static load position.

References Cited

UNITED STATES PATENTS 3,181,883   5/1965   Kolbe _____ 28—112.1

BENJAMIN HERSH, *Primary Examiner.*
PHILIP GOODMAN, *Examiner.*